Sept. 26, 1950  F. KRIBS  2,523,700
HOG VISE
Filed Oct. 15, 1945

INVENTOR.
FRED KRIBS

BY *Victor J. Evans & Co.*
ATTORNEYS

Patented Sept. 26, 1950

2,523,700

UNITED STATES PATENT OFFICE 2,523,700

HOG VISE

Fred Kribs, Owosso, Mich.

Application October 15, 1945, Serial No. 622,318

1 Claim. (Cl. 119—102)

This invention relates to a hog vise which is particularly used to restrain a hog within a hog crate.

An object of this invention is to provide a device that restrains and holds a hog motionless during the desexing operation on the hog.

Another object of this invention is to provide a device that will restrain and hold a hog during ringing or removing of tusks.

With these and other objects and advantages in view the invention consists of the novel details of construction arrangement and combination of parts more fully hereinafter described, claimed and illustrated in the accompanying drawing in which:

Figure 1:
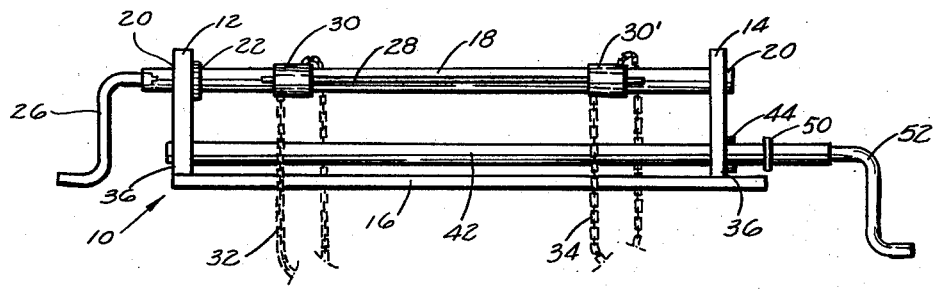
Figure 1 is a side elevation of an embodiment of the invention.
Figure 2:
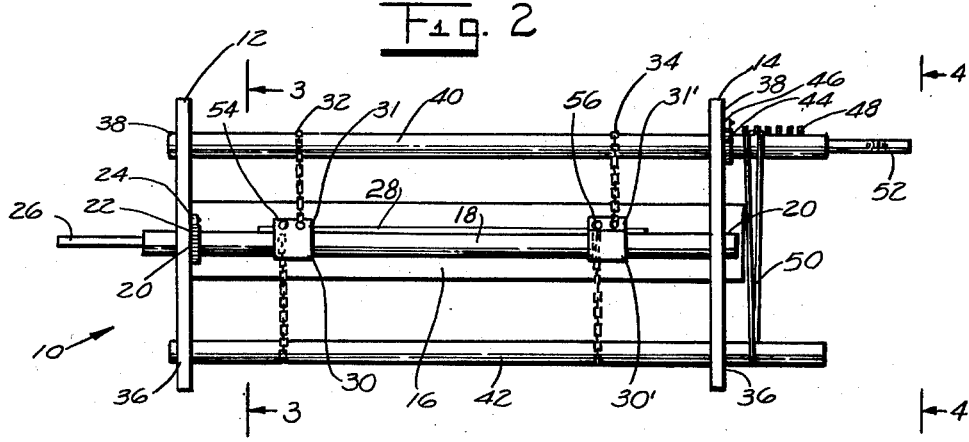
Figure 2 is a top plan view thereof.
Figure 3:
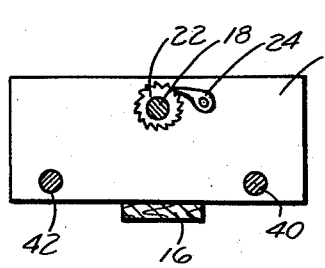
Figure 3 is a sectional view on the line 3—3 of Figure 2.
Figures 4, 5:
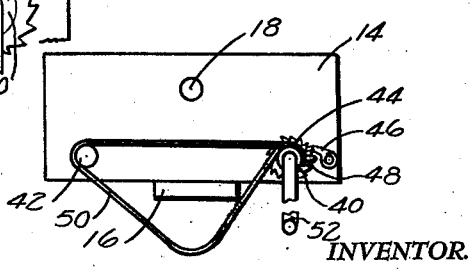
Figure 4 is an end view looking in the direction of the arrows on the line 4—4 of Figure 2
Figure 5 is an enlarged detailed view of the rope tightening mechanism.

Referring more in detail the reference character 10 designates the frame which comprises the rectangular end pieces 12 and 14 which are joined together at their bottom edges by the rectangular brace 16.

A pipe 18 is journalled at the upper medial points 20 of the end pieces 12 and 14 and is provided with a rachet 22 having a dog 24 mounted on the end piece 12 coacting therewith, and a crank 26 inserted in one end of the pipe 18 to control the rotation thereof.

The pipe 18 has an elongated key 28 welded thereto to prevent rotation of split collars 30 and 30' respectively which are slidably mounted on the pipe 18. The collars 30 and 30' respectively have extending ears 31 and 31' respectively and one end of chain 32 is secured to the ear 31 on collar 30 while one end of chain 34 is secured to the ear 31' on the collar 30'. These collars 30 and 30' respectively being slidably mounted on the pipe 18 can be adjusted thereon according to the size of the animal.

Parallel with and journalled in the lower opposite ends 36 and 38 respectively of the ends 12 and 14, so that with pipe 18 they form a triangle are the pipes 40 and 42 respectively.

Pipe 40 is provided with a ratchet 44 and a dog 46 mounted on the end piece 14 coacts therewith. The pipe 40 is also provided with relatively spaced hooks 48 to receive the ends of the cable 50, and a crank 52 inserted in the end of the pipe 40 controls the rotation thereby.

In operation of the device with the animal in the crate the device is placed on the top of the crate and the chain 32 is passed over pipe 40, under the animal in front of its hind legs up over pipe 42 and hooked at 54 to the collar 30.

The chain 34 is passed over pipe 40 under the animal, back of its forelegs over pipe 42 and hooked at 56 to the collar 30'. Therefore when pipe 18 is turned by means of the crank 26 both chains will wind at the same time pulling the animal up to the brace 16 thus holding the animal motionless.

For ringing or removing tusks the cable 50 is hooked at one end to the hooks 48 passed downward and looped around the hog's nose then up over pipe 42 to be attached to another hook 48; and when the crank 52 is turned the cable 50 will be tightened about the hog's nose and will hold the hog's head and nose firmly therein.

For desexing the hog he is restrained as previously described; the gate of the crate is removed, the crate is turned bottom up and will remain in this position until the operation has been completed.

To prevent damage to the hog while being restrained a piece of garden hose can be placed on the chain where it comes in contact with the animal.

It is believed that the operation and construction of the device will be apparent to those skilled in the art and that it is to be understood that modifications and changes in the combination and arrangement of parts can be resorted to without departing from the spirit of the invention or the scope of the appended claim.

Having thus described the invention, what is claimed as new and desired to be secured by Letters Patent is:

In a hog vise having a frame including two rectangular shaped end pieces that are joined together at their bottom edges by a rectangular shaped brace, a pipe member journalled in said end pieces centrally of their outer edges, a ratchet on one end of said pipe member, a dog on one of said end pieces for coaction with the ratchet and a crank adapted to be detachably connected to the pipe member, the improvement comprising, a pair of pipe members journalled in said end pieces in the opposite ends thereof in parallel relation to said first pipe member, a pair of split collars slidably mounted on said first pipe member and said first pipe member and said collars provided with coacting means to retain the collars in fixed rotational relation to said first pipe member, a second ratchet on one of said last pair of pipe members, a dog on one of said end pieces in engagement with the said second ratchet, hooks on said last pipe member outwardly of the last-mentioned said end piece, a cable passed over the other of said second pipe members, and connected to the hooks on the first of said last-mentioned pipe members, a crank adapted to be detachably connected to the first of said last-mentioned pipe members and chains fixed at one end to said collars and adapted to be extended over said second pipe members and then detachably connected at their opposite ends to said collars whereby rotation of said first-mentioned crank member will cause simultaneous winding of said chains on the first of said pipe members.

FRED KRIBS.

REFERENCES CITED

The following references are of record in the file of this patent:

UNITED STATES PATENTS

| Number | Name | Date |
|---|---|---|
| 192,672 | Bowman et al. | July 3, 1877 |
| 819,429 | Hemphill | May 1, 1906 |
| 1,668,384 | Stefl | May 1, 1928 |
| 1,746,115 | Hermanni | Feb. 4, 1930 |

FOREIGN PATENTS

| Number | Country | Date |
|---|---|---|
| 647,203 | France | July 24, 1928 |